United States Patent [19]

Pellicane

[11] Patent Number: 4,960,100
[45] Date of Patent: Oct. 2, 1990

[54] CONVEYOR OVEN

[75] Inventor: Jack E. Pellicane, Glendale Hgts., Ill.

[73] Assignee: Mastermatic, Inc., Villa Park, Ill.

[21] Appl. No.: 322,256

[22] Filed: Mar. 13, 1989

[51] Int. Cl.$^5$ .............................................. F24C 15/32
[52] U.S. Cl. ................................ 126/21 A; 126/21 R; 126/41 B; 126/41 L; 99/414
[58] Field of Search .................... 126/21 A, 1 B, 1 D, 126/21 R, 41 B, 41 C, 20; 99/473, 474

[56] References Cited

U.S. PATENT DOCUMENTS

| | | | |
|---|---|---|---|
| 4,377,109 | 3/1983 | Brown et al. | 126/21 A X |
| 4,776,319 | 10/1988 | Colangelo et al. | 126/39 C X |
| 4,834,063 | 5/1989 | Hwange et al. | 126/41 R X |

Primary Examiner—Larry Jones
Attorney, Agent, or Firm—Lowe, Price, LeBlanc, Becker & Shur

[57] ABSTRACT

A versatile conveyor oven effective to product a variety of different cooking conditions therein is described. The oven includes an elongated cabinet defining a cooking chamber having an inlet port and an outlet port with a conveyor extending through the oven from the inlet to the outlet. A plate defines the upper surface of the cooking chamber and the plate has a plurality of arrays of holes each mutually spaced from the adjacent arrays. The lower portion of the cooking chamber is defined by a plurality of discreet nozzles mutually spaced from the inlet to the outlet, each nozzle defining a slot orifice disposed transverse to the path of travel of the conveyor. A heating means is provided and the blower to deliver heated air into a plenum, and from there into an upper air chamber emptying out into the foraminous plate and into a lower chamber which empties out into the discreet nozzles. Cooking conditions in the chamber can be controlled by blocking off individual nozzles, blocking off individual holes, or restricting the flow of air into the upper air chamber from the plenum.

15 Claims, 4 Drawing Sheets

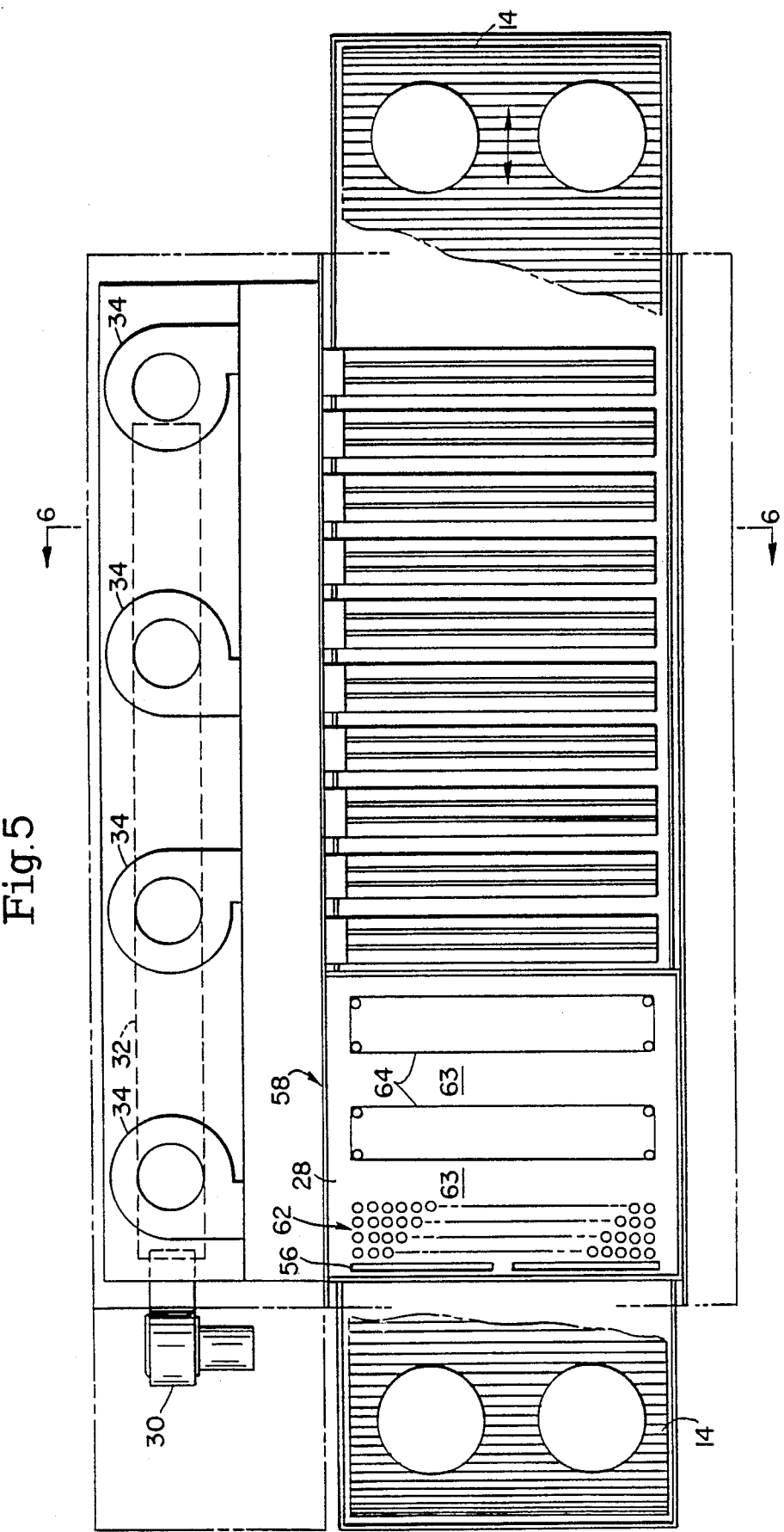

CONVEYOR OVEN

BACKGROUND OF THE INVENTION

This invention relates to an improved conveyorized, forced air convection oven which can be adapted to cook a wide variety of different products, including, but not limited to pizza, chicken, mandarin duck, bread, and the like. The oven of this invention utilizes heated convection currents under pressure in different zones combined with radiant heat and it is intended primarily for use in restaurants, fast food establishments and the like.

DESCRIPTION OF THE PRIOR ART

Conveyor ovens or tunnel heaters have been in use for several years, primarily in the fast food industry to cook pizzas. In the cooking of pizza, it is necessary to apply different heating characteristics to the crust than to the topping. The dough shell should be cooked thoroughly to provide a, tender crisp, crust. If the heating conditions applied to the dough shell however are applied to the topping, the cheese will in all likelihood burn. Accordingly, in U.S. Pat. Nos. 4,377,109 and 4,471,000 hot air under pressure from a burner is introduced into nozzles which are disposed below the product to be cooked. As the product passes along through the conveyor oven the crust is directly impinged upon by the stream of heated air from each nozzle. However, the space between products permits the exposed nozzles to direct heated air against the overhead of the cooking chamber whereupon the stream of heated air is reflected downwardly onto the surface of the product to be cooked. Therefore, the underside of the pizza is subjected to heated air at a much higher velocity and therefore higher temperature than the upper surface which contains the toppings, cheese and the like.

In U.S. Pat. Nos. 4,471,750 and 4,576,090 there are provided foraminous air plates both above and below the product to be cooked which are mutually spaced and separated by nonforaminous plates so that the product is subjected to a blanket of turbulent heated air both above and below as it passes through the foraminous section and then to heat under much lower velocity as it passes through an imperforate zone. The products then pass through nondiscreet zones of high and relatively low convective heating. This permits moisture within the product to migrate to the surface as the product passes through the imperforate zone so that the moisture can evaporate as the product passes through the perforate zone of high convective heating. These patents also describe a novel ducting system whereby heated air from the burner is blown through a scroll shaped passageway and a venturi section into a plenum for increased turbulence so that the air passing through the perforate sections onto the product will be in a turbulent flow and act as a heated blanket of air rather than a jet which would heat a discreet area after passing through a nozzle onto the product.

The nozzles described in U.S. Pat. Nos. 4,377,109 and 4,471,000 are elongated and extend laterally across the conveyor. In contrast, the nozzles described in for example U.S. Pat. Nos. 4,591,333, 4,626,661 and 4,679,542 are individual circular nozzles with a plurality thereof mutually spaced across the area of the cooking chamber.

Similarly, in U.S. Pat. No. 3,908,533 slits are provided which extend transverse to the path of travel of the conveyor and in U.S. Pat. No. 4,701,340, discreet jets are described as being disposed above and below the food to be cooked at the beginning and the ending of the heating chamber with a middle chamber having discreet jets below the food and steam above.

As noted above however, these references are directed primarily to the cooking of pizza or similar products wherein a dough shell is formed which contains on its upper surface a filling of some sort which should be cooked at either a lower temperature or for a shorter period of time than the dough shell itself.

SUMMARY OF THE INVENTION

It has now been discovered that the conveyor oven concept can be adapted to the cooking of any of a wide variety of different products and the cooking temperature can be so controlled that the same oven can be easily modified to cook either pizza or a wide variety of different products including poultry and bakery products.

The device of this invention utilizes mutually spaced discreet nozzles, each nozzle extending laterally across the path of travel of the conveyor. The nozzles are disposed beneath the product to be cooked. A plurality of mutually spaced foraminous plates are disposed above the product to be cooked extending laterally across the path of travel of the conveyor. A vertically disposed blower wheel is mounted above the burner flame tube and a plurality of said blowers are mutually spaced along the back of the conveyor oven of this invention. The disposition of the blowers permits a compact external appearance so that a plurality of the ovens of this invention may be stacked and operated independently. In addition, an air intake diverter is provided for the air intake to the burner box to equalize the pressure at the air intake and to provide for the admission of only air returning from the central nozzles so that the air intake is as warm as possible for greater efficiency.

The blower discharges hot air into a plenum. The plenum empties into an upper and a lower air chamber. The upper air chamber is disposed above the foraminous plates and the lower air chamber is disposed below the nozzles. The lower air chamber utilizes a plurality of baffles disposed along the interior thereof to equalize the air pressure to the nozzles. The baffles are provided so that the air pressure is relatively equal across nozzle rather than being higher at the nozzle opening adjacent the entrance than at the nozzle opening remote from the entrance.

The plenum empties into the upper air chamber through a plurality of mutually spaced ports. One or more of these ports may be blocked totally or partially to adjust the pressure within the upper chamber. This is only one of the means for adjusting the cooking environment within the device of this invention. In addition, one or more of the lower nozzles may be blocked by nozzle blocking channels which are merely covers. Furthermore, the number of baffles in the lower air chamber may be changed. Furthermore, metal plates may be used to partially or fully block some or These different changes may be made in an effort to increase or decrease the air velocity and therefore the cooking temperature. By selectively closing or opening the plenum openings in the upper chamber along with opening or closing the hole patterns in the upper plates and controlling motor blower speed, we can induce baking characteristics suitable for a variety of different products. In combination with nozzle adjustment, a pulsing effect within the baking chamber can be provided whereby high and low pulses of hot air impact upon the product as it travels through the cooking chamber.

Accordingly, it is an object of this invention to provide a conveyor oven which can be easily modified to cook a wide variety of different products at site location or factory.

It is yet another object to provide a conveyor oven which uses a lateral nozzle to impinge hot cooking air on the under surface of the product to be cooked and an intermittent blanket of hot air on the upper surface whereby as the product passes along the conveyor, the lower surface will encounter mutually spaced, discreet jets of heated air with each jet of heated air extending laterally across the path of travel, and mutually spaced areas of high and low convection heat in a turbulent blanket impinging upon the upper surface.

It is yet another object of this invention to provide a conveyorized cooking oven in which high and low pulses of hot air are intermittently impinging upon the upper and lower surface to be cooked as it passes through the cooking chamber.

It is yet another object of this invention to provide a conveyorized cooking oven which can be adapted to a wide variety of different foods and which is compact so that units can be stacked one on top of the other to a desired height and in which the conveyor can run in either direction desired depending upon the kitchen layout.

BRIEF DESCRIPTION OF DRAWINGS

These and other objects will become readily apparent with reference to the drawings and following description wherein:

FIG. 5 is a cross-sectional view taken along lines 5—5 of FIG. 4.

DETAILED DESCRIPTION OF THE INVENTION

Figure 1:
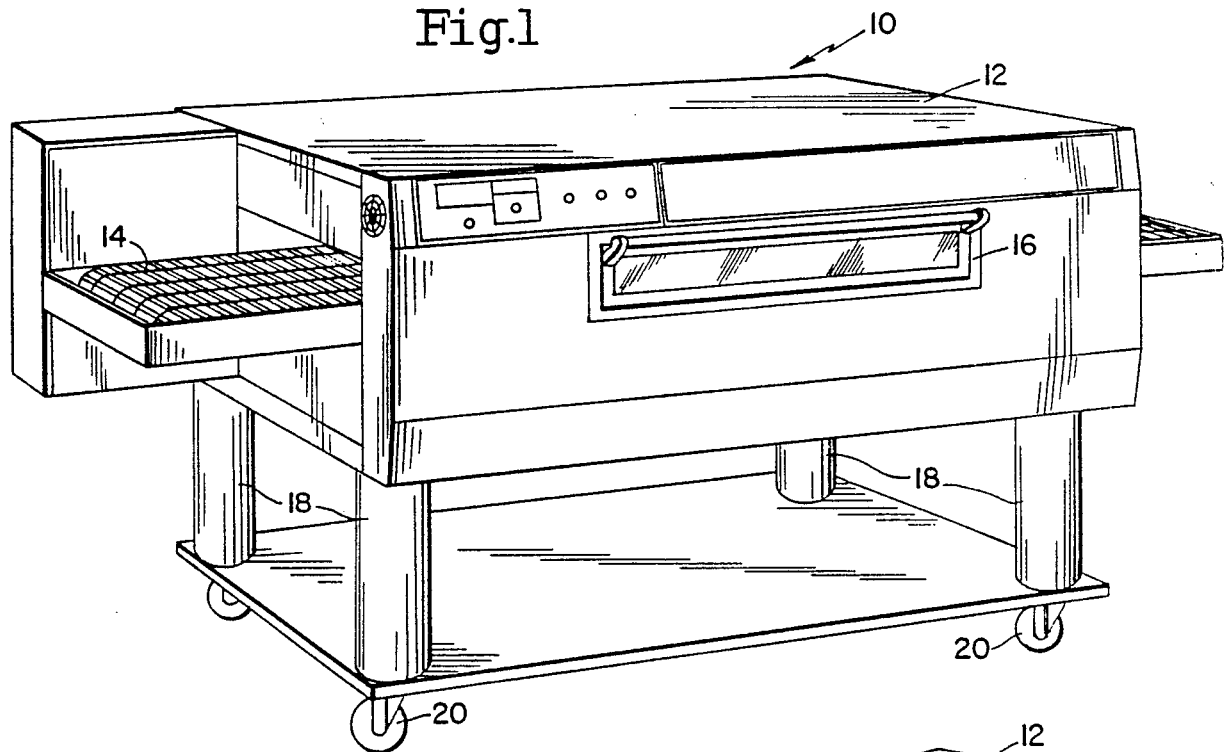
FIG. 1 is a perspective view of an embodiment of this invention.
Figure 2:
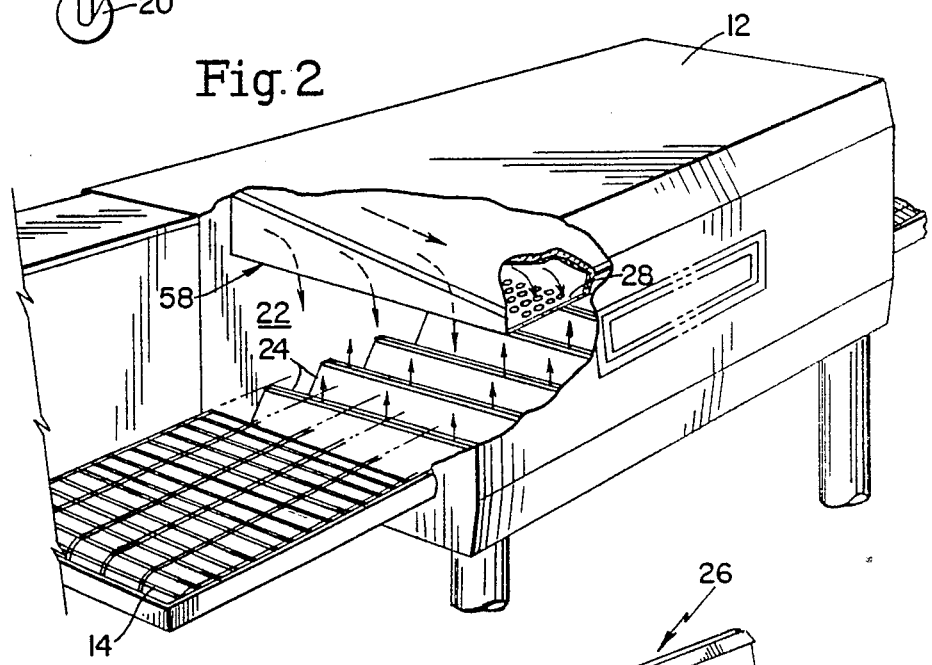
FIG. 2 is a fragmentary view with a portion of the cooking chamber wall removed.

With attention to the drawings and to FIGS. 1 and 2 in particular, the device of this invention 10 preferably includes a cabinet 12 which is rectangular in cross-section having open ends with a conventional conveyor belt 14 rotatably mounted therein which extends from an inlet and from an outlet in the cabinet. Belt 14 may be of conventional mesh design and is intended to be mounted for movement either right to left or left to right so that it is reversible depending on the kitchen configuration. Preferably the front face of the cabinet 12 will be provided with a door 16 or sliding panels, preferably containing tempered glass so that the operator can observe the movement of product and which will allow access to the interior of the oven. Door 16 can be utilized to insert food items which do not have a cooking time which requires that they travel the entire length of the cooking chamber. The device 12 pictured in FIG. 1 is equipped with legs 18 which mount wheels 20. As will be subsequently explained, when the units are stacked, legs 18 are removed.

Figure 3:
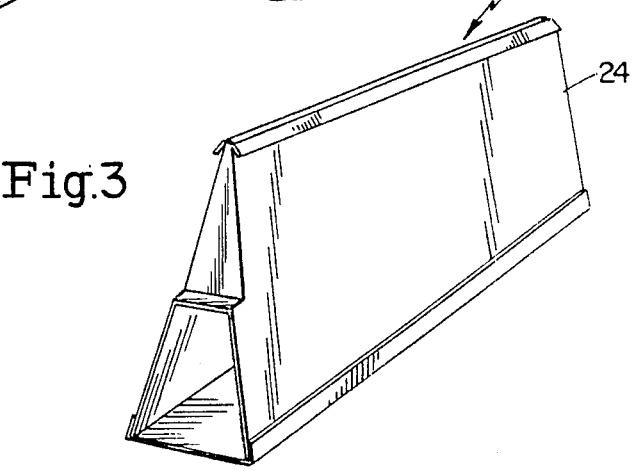
FIG. 3 is a perspective view of a nozzle disposed in the lower cooking area.

With attention to FIG. 2, the cooking chamber 22 mounts a plurality of lower nozzles 24 which are mutually spaced along the path of travel of the conveyor 14 and which have openings 26 which extend laterally across the path of travel of the conveyor 14. See FIG. 3. Preferably, the nozzles 24 are triangular in cross-section and shall have baffles which equalize the pressure across the entire width of the nozzles.

A plurality of mutually spaced foraminous plates 28 are provided over conveyor 14. As will be subsequently explained, heated air passes through the foraminous plates in a turbulent blanket as compared to a discreet jet to impinge upon the upper surface of the product on the conveyor while heated air from the nozzles 24 provides a discreet jet which extend across the bottom of the product to be cooked. Foraminous plates 28 and nozzles 24 are mutually spaced along the path of travel of the conveyor so that the surface of the product to be cooked which is impinged upon by the heated blanket of air or by the heated jet of air will continually pass from an area of high velocity to an area of low velocity as it traverses through the length of the cooking chamber 22.

Figure 7:
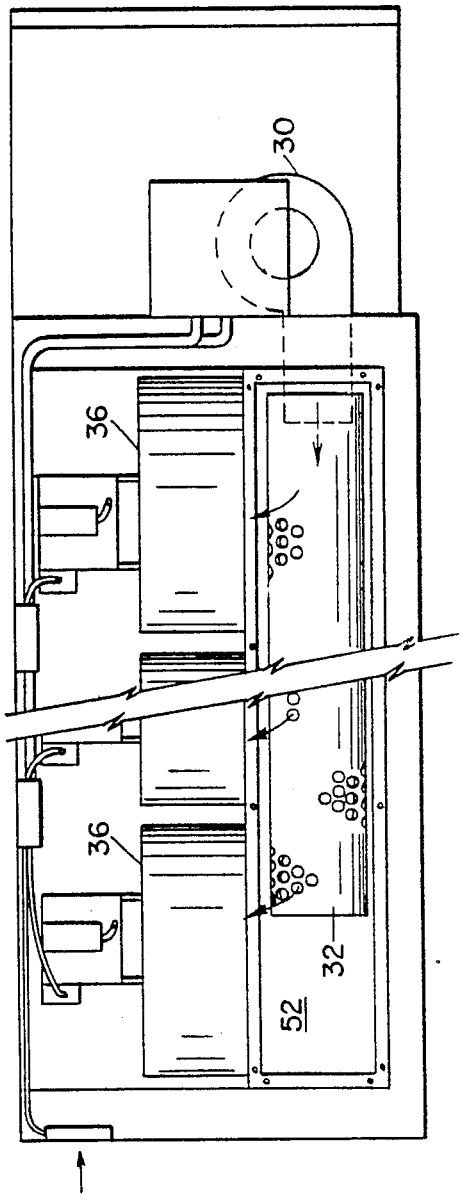
FIG. 7 is a rear view of the device of this invention with back wall and insulation removed.
Figure 6:
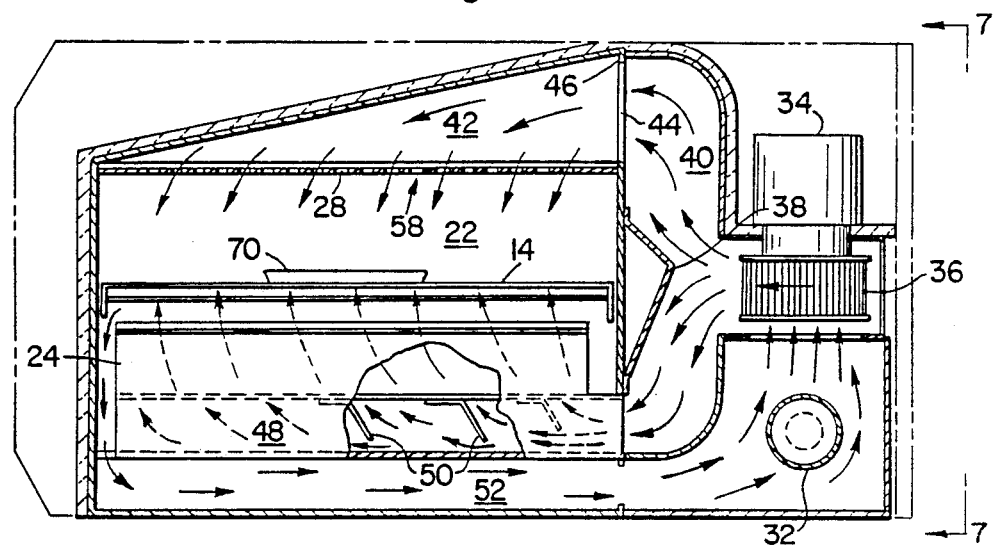
FIG. 6 is a cross-sectional view taken along lines 6—6 of FIG. 5.

With attention to FIGS. 5, 6 and 7, heat to the device of this invention 10 is supplied by a burner 30 and flame tube 32 which extends substantially the length of cabinet 12. A plurality of blowers 34 having wheels 36 are mutually spaced along the length of the flame tube 32 as shown for example in FIG. 5. The wheels may be rotated in a predetermined sequence.

The hot air from blower 36 is separated by a divider 38 when it enters plenum chamber 40. One stream is diverted upwardly into the upper air chamber 42 through openings 44 in the plenum wall 46. See FIG. 4. As shown in FIG. 6, upper air chamber 42 is tapered to equalize the pressure of the air exiting through foraminous plates 28 into and entering the cooking chamber 22.

The other stream enters lower air chamber 48 and passes through a baffle system 30 and into nozzles 24 to thereby enter cooking chamber 22. Baffles 50 are intended to equalize the pressure laterally across the nozzle 24 so that the flow through the nozzle opening 26 will be substantially at the same pressure laterally across the nozzle 24.

Figure 4:
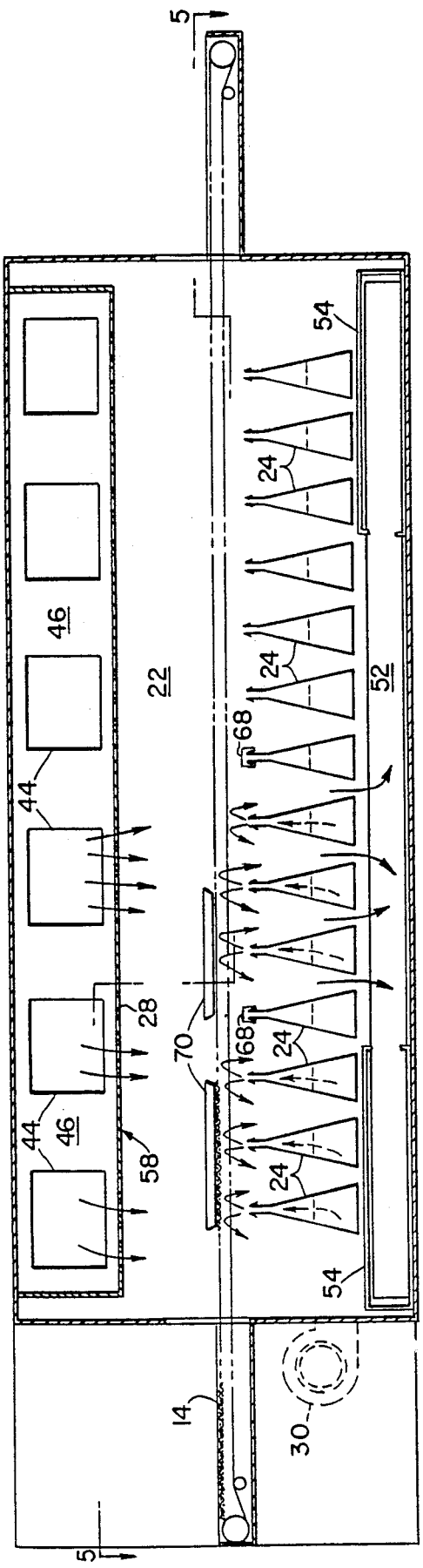
FIG. 4 is a cross-sectional view of an embodiment of the device of this invention.

The air then returns via return chamber 52. Air diverters 54 as shown in FIG. 4 are provided. These channel shaped members serve to block off return air from between the three nozzles at either end of the cooking chamber 22. The return from these nozzles would be most likely to have outside air and therefore would be cooler. In this way only the hotter air within chamber 22 is recycled via return chamber 52 to be reheated by flame tube 32 for recirculation.

Slits 56 are provided at either end of the cooking chamber in the ceiling 58 thereof. The slits are intended to direct an air curtain across the cabinet openings to thereby minimize both the entrance of cool ambient air and the exit of heated from within the cabinet 12. The use of slits 56 is intended both the improve the economy of the operation of the device of this invention, but also worker comfort.

In addition to varying the blower speed or the speed of the conveyor, the device of this invention is provided with three primary mechanical means for varying the conditions within cooking chamber 22. With reference to FIG. 5, the foraminous plates 28 have mutually spaced hole patterns 62 which extend therealong. Each hole pattern 62 is separated by an imperforate section 63. If it is desired, plates 64 may be used to block the hole patterns 62. Plates 64 also may have about ⅛ inch peripheral indentations (not shown) to permit the same heated air around the plates to thereby lower the velocity through uncovered hole patters 62 for further control of cooking conditions.

In addition, as previously noted, heated air enters the upper air chamber 42 via openings 44 in the upper plenum wall 46. Openings 44 may also be blocked by any convenient plate (not shown).

Finally, channel members 68 may be used to block nozzles 24 as shown in FIG. 4. By utilizing upper blocking plates 64, and channel member 68, a pulsing condition can be provided within chamber 22 whereby the food product 70 passing therethrough encounters areas of high velocity or turbulence followed by areas of low velocity. In addition, the heated air in upper chamber 42 will heat the imperforate areas 63 and plates 64 so that the upper surface of the food will be subjected to radiant energy in the areas of low velocity.

Figure 8:
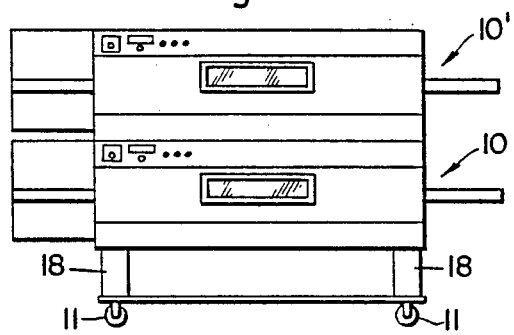
FIG. 8 is a front view of the device of this invention with two units stacked.
Figure 9:
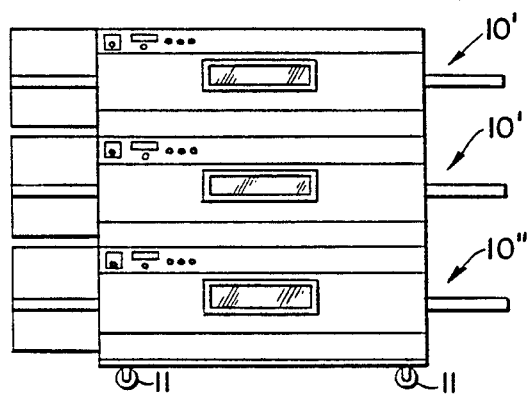
FIG. 9 is a view similar to FIG. 8 showing a stack of three units of this invention with the legs removed from the lower unit.

As shown in FIGS. 8 and 9, the device of this invention 10 may be stacked with a similar unit 10' which would have legs 18 removed. In addition, two such units 10' can be stacked on a third unit 10" which has wheels 11 but no legs 18.

In summary, a highly versatile conveyor oven or tunnel heater is described herein. The device uses mutually spaced nozzles directed upwardly against the bottom of the product to be cooked wherein each nozzle directs a jet of air transverse to the path of travel of the conveyor. The ceiling portion of the cooking chamber displays mutually spaced arrays of holes to form foraminous areas extending laterally across the path of travel of the conveyor separated by imperforate areas. A jet of air then encounters the bottom of the product while the upper surface passes through a turbulent hot blanket of heated air and into a low velocity area where it is subjected to radiant energy followed by a repetition as the product to be cooked passes through the cooking chamber.

The device of this invention is highly versatile and able to cook a wide variety of different food products due to three primary controls. These controls include channel members which can block preselected nozzles, upper air plate members which can block preselected rays of holes in the ceiling, and additional plate members which can be used to block the entrance of heated air through openings in the upper plenum wall from the plenum chamber into the upper air chamber. In addition to these three primary means, obviously the conveyor speed or the blowers could also be used to regulate or vary the cooking conditions.

The invention may be embodied in other specified forms without departing from the spirit or essential characteristics thereto. The present embodiments are therefore to be considered in all respects as illustrative and not restrictive, the scope of the invention being indicated by the appended claims rather than by the foregoing description, and all changes which may come within the meaning and range of equivalency of the claims are therefore intended to be embraced therein.

What is claimed:

1. A versatile conveyor oven effective to produce a variety of different cooking condition comprising:
   an elongated hollow cabinet defining a cooking chamber having an inlet port at one end and an outlet port at an opposite end;
   an open mesh conveyor extending through the cabinet from outside the inlet to outside the outlet and means for moving said conveyor relative to said cabinet along a path of travel in a predetermined diretion through the cooking chamber so that product to be cooked placed on the conveyor at the inlet will travel on the conveyor through the cooking chamber to the outlet;
   foraminous plate means disposed within the cooking chamber above said conveyor and extending substantially from the inlet to the outlet for dispensing a blanket of high velocity heated air downwardly onto the upper surface of the conveyor at mutually spaced zones along the length thereof;
   nozzle means disposed within the cooking chamber below said conveyor and extending substantially from the inlet to the outlet for dispensing mutually spaced discrete jets of heated air upwardly onto the lower surface of said conveyor along the length thereof, each jet extending laterally across the width of said conveyor;
   heating means and blower means coupled thereto for supplying heated air to said plate means and nozzle means;
   first means coupled to said plate means for spacing the high velocity heating zones a predetermined distance apart; and
   second means coupled to said nozzle means for spacing the discrete jets a predetermined distance apart.

2. The oven of claim 1 further comprising recycle means for collecting heated air within the cooking chamber from below said nozzle means and conveying said air to said heating means for recirculation.

3. The oven of claim 2 wherein said recycle means collects air only below the central portion of said cooking chamber.

4. The oven of claim 1 further comprising baffle means disposed below said nozzle means for equalizing the heated air pressure across each discrete jet.

5. The oven of claim 1 wherein said first means further comprises radiant heat dispensing means disposed between each high velocity heating zone.

6. The oven of claim 5 wherein said plate means comprises a metal plate having a plurality of laterally extending mutually spaced arrays of holes and said blower means directs a turbulent flow of heated air therethrough to form said zones.

7. The oven of claim 6 wherein said first means includes a plurality of blocking plates disposed to fully or partially cover predetermined arrays of holes in said plates.

8. The oven of claim 7 wherein said blower means includes means for heating said blocking plates whereby said plates when heated dispense radiant energy into said cooking chamber.

9. The oven of claim 1 further comprising a plenum chamber disposed in communication with said blower means for receiving a flow of heated air;

upper air chamber disposed above said plate means and in communication with said plenum and with said plate means; and lower air chamber disposed below said nozzle means and in communication with said plenum and said nozzle means; and divider baffle means disposed in said plenum for direction a flow of heated air into each of said upper and lower chambers 10. The oven of claim 9 wherein said first means includes port means disposed between said plenum and upper air chamber for controlling the flow of heated air into said upper chamber from said plenum.

11. The oven of claim 10 wherein said port means includes a plenum wall separating said plenum and upper air chamber said wall having a plurality of ports therein and said port means further including means for blocking predetermined of said ports.

12. The oven of claim 1 wherein said nozzle means comprises a plurality of mutually spaced slot orifices each in a housing the interior of which is in communication with said blowers means, each orifice extending perpendicular to the path of travel of said conveyor.

13. The oven of claim 12 wherein each housing is triangular in cross-section with the orifice formed at the apex thereof said oven further comprising baffle means disposed between said blower means and housings for equalizing the pressure across each orifice.

14. The oven of claim 13 wherein said second means includes a plurality of channel members adapted to fit over and close predetermined nozzle orifices.

15. The oven of claim 1 further comprising air curtain means extending over the inlet and outlet ports to contain heated air within the cooking chamber and exclude ambient atmosphere.

* * * * *